March 20, 1945.  H. C. SMITH ET AL  2,371,715
METAL CUTTING TOOL
Filed Dec. 14, 1943
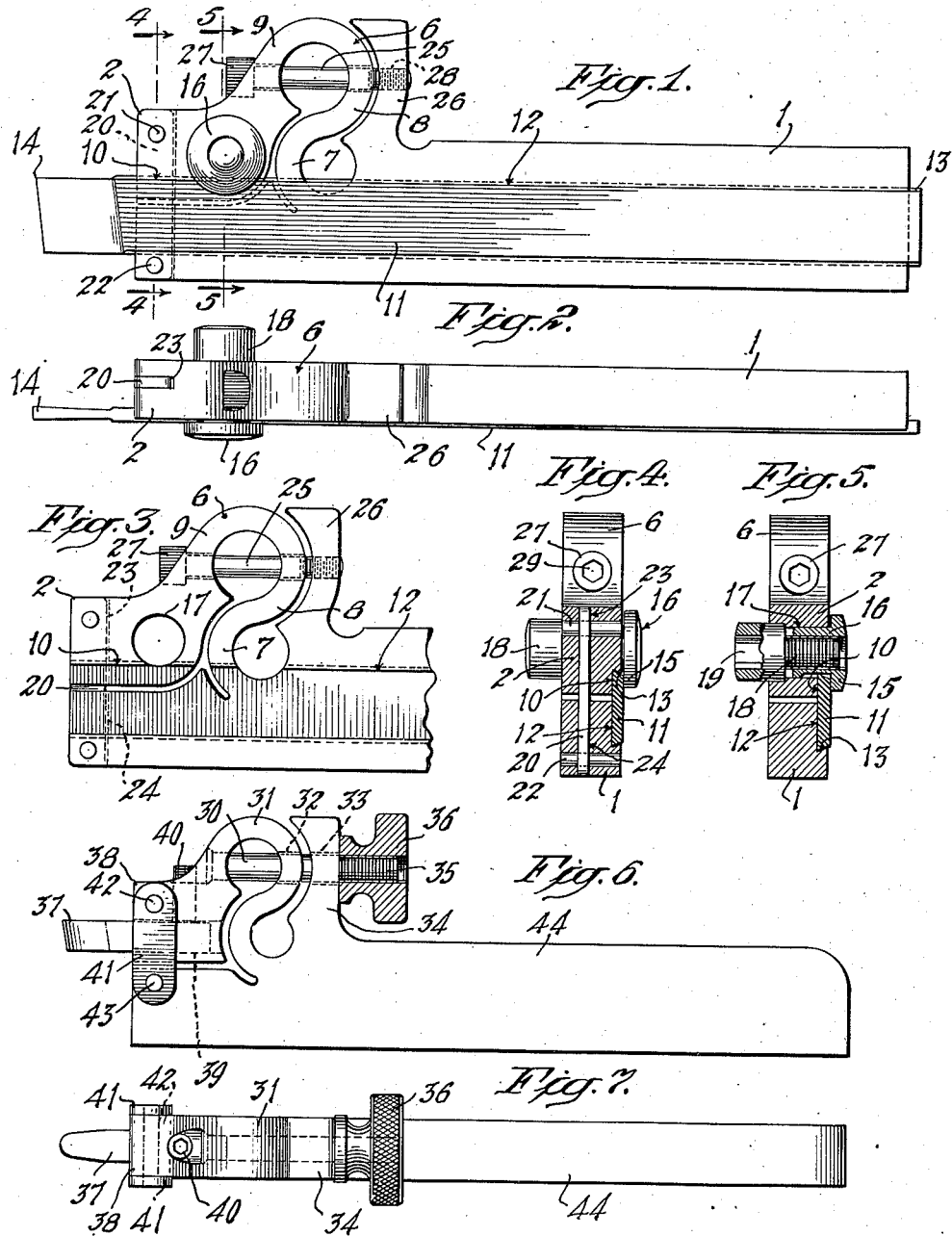
INVENTORS:
Harold C. Smith and
Richard C. Johnsen,
BY Harry R. Cook,
ATTORNEY

Patented Mar. 20, 1945

2,371,715

UNITED STATES PATENT OFFICE 2,371,715

METAL CUTTING TOOL

Harold C. Smith and Richard C. Johnsen,
West Orange, N. J.

Application December 14, 1943, Serial No. 514,218

2 Claims. (Cl. 29—97.5)

This invention relates generally to lathe tools and particularly to cutting-off tools, thread cutting tools and the like.

During use of lathe tools, particularly in cutting-off and thread cutting work, there is frequently a tendency for the tool to chatter or to gouge the work, especially when the tool encounters excessive resistance to cutting as when the tool is advanced too rapidly into the work or is set for an excessively deep cut. In our United States Patent No. 2,242,033 dated May 13, 1941, we described a metal cutting tool wherein the cutter or bit is capable of yielding linearly from the work in the plane of advance of the cutter to the work, and at the same time lateral movement of the bit or cutter in planes at angles and planes parallel to the axis of the work, is prevented, whereby chattering of the tool or gouging of the work is obviated.

A tool of this character generally comprises a shank having a bit or cutter holder connected integrally to the shank by a resilient goose neck to permit linear yielding of the cutter away from the work, and means for preventing lateral movement of the cutter holder in planes at angles to the axis of the work and in planes parallel to the work axis.

Depending upon the nature of the work being done and also upon whether a light cut or a heavy cut in the work is being made by the tool, it is desirable to have the cutter held either practically rigidly or yieldable in various degrees with respect to the work. Also when the cutter is yieldable relatively to the work some means generally is necessary to prevent or limit "snap action" on the return of the cutter to the work after yielding thereof from the work for any reason.

Therefore, one object of the present invention is to provide a tool such as that above referred to which shall include novel and improved means for adjusting the resiliency of the goose neck spring at the will of the machinist to accommodate the tool to the working conditions and to limit or prevent "snap action" on the movement of the cutter to the work by the resilient goose neck.

Another phase of our invention concerns particularly cutting-off tools, for example of the general type shown in Patent No. 2,108,237 dated February 15, 1938. In the tool described in that patent, the cutter blade is slidable in a dovetail groove in the shank and is connected by a screw to a spring mounted in a recess in said shank, and "snap action" of the cutter is limited by friction imposed on the cutter to oppose the force of the spring. While that tool is satisfactory, simplification and improved operation are desirable. Therefore, further objects of the present invention are to provide a novel and improved construction and combination of a shank having a resilient goose neck provided with a cutter holder, a cutter blade, means for mounting said cutter blade on said shank and for connecting said blade to said cutter holder, and means for preventing or restraining lateral movement of the cutter holder in planes at angles to the axis of the work and in planes parallel to the work; and to provide such a tool which shall also have novel and improved means for preventing or limiting "snap action" of the cutter toward the work under influence of the spring action of said goose neck.

Other objects, advantages and results of the invention will be brought out by the following description in conjunction with the accompanying drawing in which Figure 1 is a side elevational view of a metal cutting tool embodying the invention.

Figure 2 is a top plan view thereof.

Figure 3 is a fragmentary side elevational view similar to Figure 1 showing the cutter blade and the clamping means therefor removed.

Figure 4 is a transverse vertical sectional view on the line 4—4 of Figure 1.

Figure 5 is a similar view on the line 5—5 of Figure 1.

Figure 6 is a view similar to Figure 1 showing another form of the invention, and Figure 7 is a view similar to Figure 2 showing the form of the invention illustrated in Figure 6.

Specifically describing the invention, the tool includes a holder which comprises a shank 1 in the general form of a rectangular bar which may be straight as shown in Figures 1 and 2 or may be angular or offset according to known practice.

At one end of the shank is a cutter or bit holder 2 which is integrally connected to the shank by a spring 6 that is shown in the form of a goose neck which comprises a split circular loop having the cutter holder at one end and having an extension at the other end connected to the shank at 7. More specifically, the goose neck 6 includes an arm 8 integrally connected at 7 to the shank and an arm 9 returned in juxtaposition to the arm 8 and carrying the cutter holder 2 at its free end.

The cutter holder has a recess 10 extending inwardly from the free end thereof for receiving the cutter blade 11, and preferably the recess 10 is complemental to or forms a part of a recess or groove 12 which extends longitudinally of the shank 1. The side walls of the recesses 10 and 12 are undercut and the cutter blade 11 has its longitudinal edges beveled at 13 to loosely slidably fit the undercut edges of the recesses 10 and 12.

The cutter blade has a suitable cutter or bit 14 at one end and in accordance with the invention, the cutter blade 11 is rigidly connected to the cutter holder 2 so that when the tool is mounted in a tool post of a lathe, or otherwise as desired, should the cutter encounter excessive resistance in the cutting operation it may yield linearly away from the work in a plane approximately parallel to the direction in which the cutter has been advancing toward the work, the arms of the gooseneck yielding substantially uniformly so as to permit practically linear movement of the cutter blade. As shown, the cutter blade 11 is of a thickness greater than the depth of the recesses 10 and so that when the blade is in said recesses the outer face of the blade projects beyond the plane of the face of the cutter holder, and the outer face of the blade is engaged by the flange 15 of a sleeve nut 16 which is slidably mounted in a hole 17 in the cutter holder and cooperates with a clamping screw 18 which has a polygonal socket 19 in its head to receive a suitable pin wrench. With this construction, it will be observed that the cutter blade may be rigidly clamped in or released from the recess 10 of the cutter holder by rotation of the screw 18 in the proper direction to cause engagement or disengagement of the flange 15 of the sleeve nut with or from the cutter blade respectively.

To ensure practically exact linear movement of the cutter with a minimum of tendency of the cutter holder to swing in planes at angles to the axis of the work or in planes parallel to the axis of the work, a link 20 has its opposite ends pivotally connected at 21 and 22 to the cutter holder and the shank respectively. Preferably the cutter holder and the shank have alined grooves 23 and 24 extending inwardly from their corresponding ends in which the link 20 is located. With this construction the cutter holder is constrained to move exactly linearly and is held against tilting in planes at angles to the axis of the work. The links also restrain the holder against movement laterally of the shank or in directions transverse to the plane of movement of the cutter toward and from the work. The tool holder therefore ensures against the cutter chattering or becoming jammed under and gouging the work.

At the same time the construction ensures a minimum of resistance to free and uniform linear movement of the cutter holder as compared for example with the frictional resistance that is present in some heretofore known tools of this general character wherein the cutter holder is slidably mounted on a guide.

Also, in accordance with the invention means is provided for adjusting the resiliency of the spring 6 for any desired purpose, for example to compensate for light cuts or heavy cuts in the work. For this purpose, we have shown means directly connected to the spring and to the shank for variably compressing the spring. More particularly, we have provided a screw 25 which extends loosely through the opposed arms 8 and 9 of the spring and is connected at one end to the arm 9 of the spring and at its other end to a rigid portion or post 26 on the shank which is arranged in spaced and opposed relation to the other arm 8 of the spring. Preferably one end of the screw 25 has a head 27 which abuts the bottom of a socket in the arm 9 of the spring, and the other end of the screw is screw threaded at 28 in the rigid portion or post 26. The head 27 of the screw may be shaped in any suitable way as with a polygonal wrench socket 29 for rotating the screw, and it will be observed that upon rotation of the screw in one direction the arms 8 and 9 of the spring 6 will be pressed toward each other and toward the rigid portion 26 of the shank while when the screw is rotated in the other direction the spring arms may spread apart. In this way the resiliency of the spring may be decreased or increased and if desired the spring may be so compressed as to cause a substantially rigid mounting of the cutter holder on the shank. In all cases the screw 25 will limit movement of the cutter under influence of the spring 6.

A modification of the invention is shown in Figures 6 and 7 where a rod 30 corresponding to the screw 25 has one end connected to one arm of the spring 31 which is substantially identical with the spring 6. The rod passes loosely through an opening 32 in the other arm of the spring and loosely through an opening 33 in rigid portion or post 34 on the shank 1 which corresponds to the portion 26. The end of the rod projects through the post 34, is screw threaded at 35 and has a thumb nut 36 thereon which bears against the side of the post 34 opposite the spring 31. By properly rotating the nut 36 the arms of the spring 31 can be pressed together or released as desired to adjust the resiliency of the spring.

Figures 6 and 7 also illustrate a form of the invention for holding another type of cutter, for example a threading tool 37. The cutter holder 38 which corresponds to the holder 2 has a socket 39 in which the tool 37 may be clamped by a set screw 40 in the usual way.

To perform the same function as the line 20 hereinbefore described, a link 41 may be arranged at each of opposite sides of the cutter holder, and the corresponding ends of the links may be pivotally connected at 42 and 43 to the cutter holder 38 and shank 44 respectively. If desired, only one link may be used but the two links provide a better balanced support for the cutter holder.

Other modifications and changes in the details of construction of the tool will occur to those skilled in the art as within the spirit and scope of the invention.

What we claim is:

1. A tool holder comprising a shank, a cutter holder, a spring carrying said cutter holder and connected at one end to said shank, and adjustable means for varying the resiliency of said spring, said means being connected to said spring between its said end and said cutter holder and to said shank in spaced relation to said end of said spring.

2. A tool holder comprising a shank, a goose neck spring comprising two juxtaposed arms, one end of one of which is connected to said shank while the free end of the other arm carries a cutter holder, said shank having a longitudinal recess to slidably receive a cutter blade, means on said cutter holder for rigidly connecting a blade that is mounted in said recess to said cutter holder to permit yielding linear movement of said cutter holder and said blade under working thrust on said blade, and a link having its ends pivotally connected to said cutter holder and to said shank respectively to permit said yielding linear movement of said cutter holder and to prevent lateral movement thereof in all directions.

HAROLD C. SMITH.
RICHARD C. JOHNSEN.